(12) United States Patent
Sugimoto et al.

(10) Patent No.: US 9,827,949 B2
(45) Date of Patent: Nov. 28, 2017

(54) ELECTRIC STEERING LOCK DEVICE

(71) Applicants: ALPHA CORPORATION, Yokohama-shi, Kanagawa (JP); NISSAN MOTOR CO., LTD., Yokohama-shi, Kanagawa (JP)

(72) Inventors: Koichiro Sugimoto, Yokohama (JP); Kenjirou Hayashi, Atsugi (JP)

(73) Assignees: ALPHA CORPORATION, Yokohama-Shi, Kanagawa (JP); NISSAN MOTOR CO., LTD., Yokohama-Shi, Kanagawa (JP)

( * ) Notice: Subject to any disclaimer, the term of this patent is extended or adjusted under 35 U.S.C. 154(b) by 0 days.

(21) Appl. No.: 15/026,044

(22) PCT Filed: Sep. 5, 2014

(86) PCT No.: PCT/JP2014/073471
§ 371 (c)(1),
(2) Date: Mar. 30, 2016

(87) PCT Pub. No.: WO2015/049951
PCT Pub. Date: Apr. 9, 2015

(65) Prior Publication Data
US 2016/0221535 A1    Aug. 4, 2016

(30) Foreign Application Priority Data
Oct. 4, 2013  (JP) .................................. 2013-208926

(51) Int. Cl.
*B60R 25/0215*    (2013.01)
(52) U.S. Cl.
CPC ................................ *B60R 25/0215* (2013.01)
(58) Field of Classification Search
CPC ............. Y10T 70/5956; Y10T 70/5664; Y10T 70/5646; Y10T 70/565; Y10T 70/5655;
(Continued)

(56) References Cited

U.S. PATENT DOCUMENTS 6,233,986 B1 * 5/2001 Suzuki ................ B60R 25/0211
464/57
6,571,587 B2 * 6/2003 Dimig ............... B60R 25/02153
70/186
(Continued)

FOREIGN PATENT DOCUMENTS

| CN | 100425483 C | 10/2008 |
|----|-------------|---------|
| CN | 101633368 A | 1/2010 |

(Continued)

OTHER PUBLICATIONS

English translation of International preliminary Report on Patentability, (Chapter II of the PCT, PCT/IB/338, PCT/IB/409) for corresponding PCT/JP2014/073471.
(Continued)

*Primary Examiner* — Suzanne Barrett
(74) *Attorney, Agent, or Firm* — Nath, Goldberg & Meyer; Jerald L. Meyer; Stanley N. Protigal (57) ABSTRACT

The electric steering lock device (1) is provided with a cam (40) which is arranged to allow forward and reverse rotation inside of a frame (10), and a lock member (50) which, while following a cam surface (41) of the rotating cam (40), is arranged to be movable forward and backward between a locked position at the advancing end and an unlocked position at the retreating end. The cam face (41) comprises a locking and unlocking segment (41*b*) for moving the lock member (50) and a lock release position segment (41*c*). A change ratio of a cam lift amount to a rotation angle of the cam (40) in the lock release position segment (41*c*) is constructed to be smaller than the change ratio of the can lift amount to the rotational angle of the cam (40) in the locking and unlocking segment (41*b*).

5 Claims, 12 Drawing Sheets

(58) Field of Classification Search
CPC .......... Y10T 70/5659; B60R 25/02153; B60R 25/0211; B60R 25/021; B60R 25/0215; B62D 1/184; B62D 1/16
USPC .......................................... 70/182–186, 252
See application file for complete search history.

(56) References Cited

U.S. PATENT DOCUMENTS

| | | | | |
|---|---|---|---|---|
| 6,755,058 | B2 * | 6/2004 | Zillmann | B60R 25/02153 70/186 |
| 6,862,907 | B2 * | 3/2005 | Hayashi | B60R 25/0211 70/182 |
| 6,941,781 | B2 * | 9/2005 | Fukushima | B60R 25/02153 70/186 |
| 7,007,525 | B2 * | 3/2006 | Okuno | B60R 25/02153 70/186 |
| 7,021,093 | B2 * | 4/2006 | Fukatsu | B60R 25/02153 70/186 |
| 7,140,213 | B2 * | 11/2006 | Feucht | B60R 25/02153 70/186 |
| 7,151,324 | B2 * | 12/2006 | Neuhoff | B60R 25/02153 307/10.2 |
| 7,363,785 | B2 * | 4/2008 | Limburg | B60R 25/02153 70/186 |
| 7,412,858 | B2 * | 8/2008 | Tsukano | B60R 25/02153 70/186 |
| 7,810,363 | B2 * | 10/2010 | Okada | B60R 25/02153 70/186 |
| 7,856,858 | B2 * | 12/2010 | Laval | B60R 25/02142 70/186 |
| 7,870,768 | B2 * | 1/2011 | Tanioka | B60R 25/02153 70/186 |
| 7,891,221 | B2 * | 2/2011 | Sugimoto | B60R 25/02153 70/186 |
| 8,382,159 | B2 * | 2/2013 | Tanaka | B62D 1/16 280/779 |
| 8,424,348 | B2 * | 4/2013 | Dimig | B60R 25/00 70/182 |
| 8,505,346 | B2 * | 8/2013 | Sugimoto | B60R 25/02153 70/186 |
| 8,826,767 | B2 * | 9/2014 | Maniwa | B62D 1/184 280/775 |
| 8,978,811 | B2 * | 3/2015 | Laval | B60R 25/02153 180/287 |
| 2001/0025516 | A1 * | 10/2001 | Starken | B60R 25/02153 70/186 |
| 2004/0069027 | A1 * | 4/2004 | Fukushima | B60R 25/02153 70/186 |
| 2004/0250577 | A1 * | 12/2004 | Watanuki | B60R 25/02153 70/186 |
| 2005/0138977 | A1 * | 6/2005 | Suzuki | B60R 25/02153 70/186 |
| 2005/0183476 | A1 | 8/2005 | Feucht et al. | |
| 2006/0169011 | A1 * | 8/2006 | Limburg | B60R 25/02153 70/186 |
| 2007/0006620 | A1 * | 1/2007 | Fukushima | B60R 25/0211 70/186 |

FOREIGN PATENT DOCUMENTS

| | | | |
|---|---|---|---|
| JP | 2005-306163 A | 11/2005 | |
| JP | 2005-343378 A | 12/2005 | |
| JP | 2006-525169 A | 11/2006 | |
| JP | 2007-15554 A | 1/2007 | |
| JP | WO 2007063743 A1 * | 6/2007 | ....... B60R 25/02153 |
| JP | 2009-35163 A | 2/2009 | |

OTHER PUBLICATIONS

Search report dated Sep. 21, 2016, in the European counterpart application.
Official Action dated Feb. 23, 2017 in the counterpart Chinese Patent Application No. 201480054355.7 along with English translation from Global Dossier.

* cited by examiner

FIG. 15

ELECTRIC STEERING LOCK DEVICE

This is a National Phase Application filed under 35 U.S.C. 371 as a national stage of PCT/JP2014/073471, filed Sep. 5, 2014, an application claiming the benefit of Japanese Application No. 2013-208926, filed Oct. 4, 2013, the content of each of which is hereby incorporated by reference in its entirety.

TECHNICAL FIELD

The present invention relates to an electric steering lock device which limits rotation of a steering shaft of a vehicle.

BACKGROUND

Figure 1:
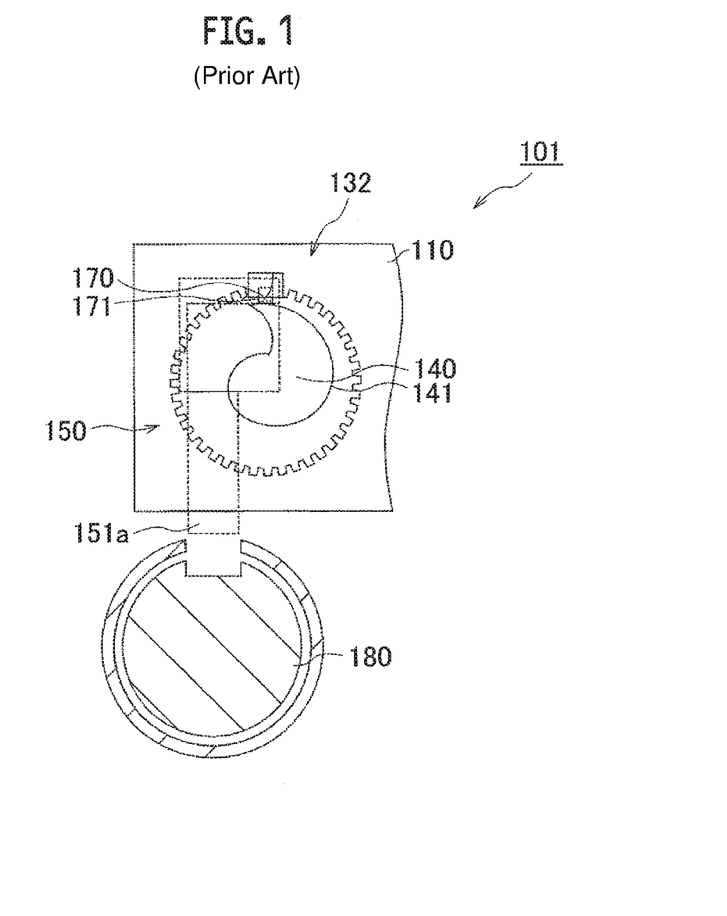
FIG. 1 is an outline cross sectional view showing an electric steering lock device according to conventional technology.
Figure 2:
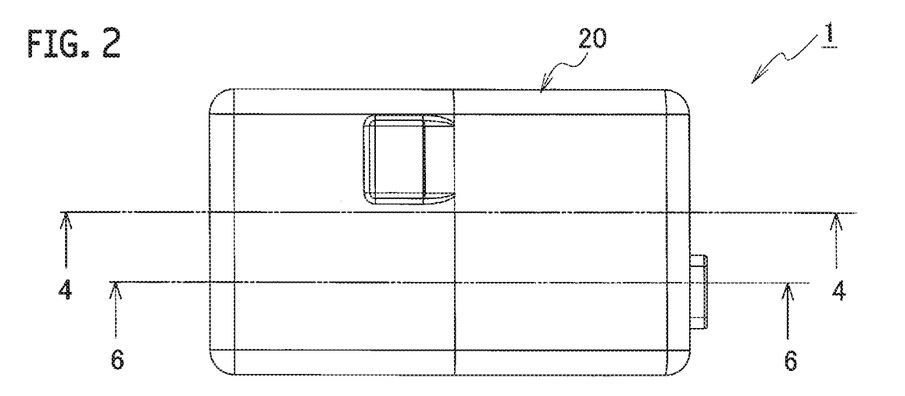
FIG. 2 shows one embodiment of the present invention and is a plan view showing an electric steering lock device.
Figure 3:
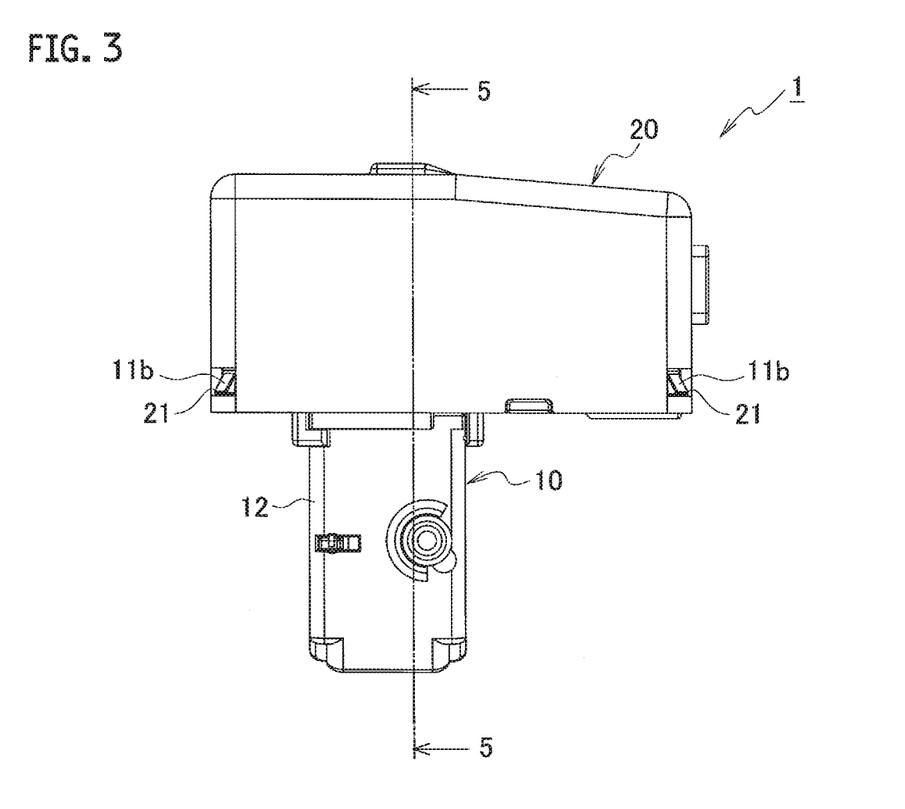
FIG. 3 shows one embodiment of the present invention and is a front view showing the electric steering lock device.

As this type of a conventional electric steering lock device, one that is disclosed in Japanese Patent Application Laid-Open Publication No. 2009-35163 (Patent Literature 1) is known. FIG. 1 shows a structure of an electric steering lock device described in Patent Literature 1. This electric steering lock device 101 is provided with a lock member 150 for prohibiting rotation of a steering shaft 180. Moreover, the lock member 150 is movably arranged between a locked position at which a tip 151a of the lock member 150 protrudes from a frame 110 and an unlocked position at which the tip 151a of the lock member 150 is accommodated inside of the frame 110. Further, the electric steering lock device 101 is provided with a cam 140 that rotates integrally with a gear wheel 132, and the lock member 150 is biased and held on a cam face 141 of the cam 140 by a biasing member (not shown). Thus, by following the rotation of the gear wheel 132, the lock member 150 moves between the locked position and the unlocked position, while sliding on the cam face 141.

LITERATURE LIST

Patent Literature

Patent literature 1: Japanese Patent Application Laid-Open Publication No. 2009-35163

SUMMARY OF THE INVENTION

Problem to be Solved by the Invention

Incidentally, in the electric steering look device 101 such as one described above, a detection switch (not shown) which detects that the lock member 150 is positioned at the unlocked position is necessary to stop rotation of the gear wheel 132.

When the detection switch is installed relative to the lock member 150, it has a structure in which the lock member 150 turns on the detection switch when the lock member 150 has moved to the unlocked position thereby stopping rotation of the cam 140. In an unlocked state in such a structure, since the lock member 150 is held on an inclined surface of the cam face 141 in a biased state by the biasing member, there is a possibility that the cam 140 may rotate toward the locking direction for some reason.

To solve such a problem, in the above conventional electric steering lock device 101, a piezoelectric element 170 is installed. Further, in a state that the lock member 150 is positioned in the unlocked position, rotation of the cam 140 toward the locking side is restricted by the friction force by pressing a protrusion 171 of the piezoelectric element 170 onto the cam face 141.

However, in the above-described conventional electric steering lock device 101, in a case that the piezoelectric element 170 becomes damaged for some reason, the piezoelectric element 170 is unable to press the cam 140, and thus, the problem is not solved.

The present invention considers the above circumstances and aims to provide an electric steering lock device which can restrict rotation of the cam in an unlocked state toward the locking direction without providing separate parts, in a state that the lock member is positioned in the unlocked position.

Means to Solve the Problem

In order to achieve the above purpose, a first aspect of the present invention provides an electric steering lock device, which includes a cam arranged to allow forward rotation and reverse rotation inside of a frame; and a lock member which, while following a cam face of the rotating cam, is arranged to be movable forward and backward between a locked position at an advancing end and an unlocked position at a retreating end, in which the cam face includes: a locking and unlocking segment for moving the lock member between the locked position and the unlocked position; and a lock release position segment in which the lock member is held in the unlocked position, and in which a change ratio of a cam lift amount to a rotation angle of the cam in the lock release position segment is constructed to be smaller than the change ratio of the cam lift amount to the rotation angle of the cam in the locking and unlocking segment.

The cam face may be constructed to have the change ratio in the lock release position segment that is constant.

A position detection device that detects that the lock member is positioned at the unlocked position may be arranged between the frame and the lock member.

The cam face may have an unlock stopping segment that is constructed to have the change ratio that is larger than the change ratio in the lock release position segment, and the locking and unlocking segment, the lock release position segment, and the unlock stopping segment may be arranged in the order of the locking and unlocking segment, the lock release position segment, and the unlock stopping segment.

Advantageous Effect of the Invention

According to the first aspect of the present invention, by setting the cam face such that the change ratio of the cam lift amount to the rotation angle of the cam in the lock release position segment is smaller than the change ratio in the locking and unlocking segment, the cam does not rotate toward the locking direction in a state that the lock member is positioned in the unlocked position. Thus, it is possible to restrict rotation of the cam without providing separate parts.

In a case that the cam face is constructed such that the change ratio of the cam lift amount to the rotation angle of the cam in the lock release position segment is made constant, the locking and unlocking segment and the lock release position segment can be made smoothly continuous. Thus, it is possible to reduce an occurrence of tapping sound when the lock member that follows the cam face is displaced between the locking and unlocking segment and the lock release position segment.

In a case that it is made to have a structure in which the position detection device detects that the lock member is positioned in the unlocked position, it is possible to accurately grasp the position of the lock member. Thus, even in a case that the linkage between the cam and the lock member has come off, it is possible to prevent that a locked state is erroneously determined as an unlocked state.

In a case that it is made to have a structure in which the unlock stopping segment is provided to have the change ratio in the unlock stopping segment that is larger than the change ratio in the lock release position segment, and it is arranged in the order of the locking and unlocking segment, the lock release position segment, and the unlock stopping segment, it becomes possible that rotation of the cam toward the unlocking direction can be stopped within the unlock stopping segment. Thus, in the unlocked state, the lock member can be held at a position that is more retreated than the unlocked position inside of the frame.

DESCRIPTION OF EMBODIMENTS OF THE INVENTION

Hereinafter, an embodiment of the present invention will be explained by referring to the drawings. A steering lock device according to this embodiment is attached to a steering column device (not shown) which accommodates a steering shaft 80 of a vehicle by a fixing device (not shown), as an electric steering lock device 1. The electric steering lock device 1 is primarily composed of a frame 10, a frame cover 20, a drive device 30, a lock member 50, and a control board 60, as shown in FIG. 2-FIG. 9.

The frame 10 is provided with a case part 11 having a generally box shape, one face of which (the upper face in FIG. 4-FIG. 9 or the like) is opened, and a cylindrical guide part 12 arranged on a bottom face 11a of the case part 11. The guide part 12 has a square cylindrical shape that communicates with a housing chamber 13 while opening to face a steering shaft 80 on its tip side, and the lock member 50 is accommodated in a guide hole 14 which is a cylinder hole to freely move forward and backward. Moreover, a stopper receiving part 15 which engages with a later-described stopper 52f is set at a housing chamber-side opening part of the guide hole 14.

The frame cover 20 has a box-shape that opens on one face (the lower face in FIG. 4-FIG. 9 or the like), and is assembled to the frame 10 by an engagement receiving part 21 provided on an inner edge of the opening part engaging with an engagement part 11b provided on a peripheral edge of the case part 11 of the frame 10. Moreover, the frame cover 20 forms the housing chamber 13 inside together with the case part 11 as a housing space. Further, the drive device 30 which drives the lock member 50 and the control board 60 which controls operations of the drive device 30 are accommodated in the housing chamber 13.

The drive device 30 is composed of an electric motor 31 as a driving source, a worm gear (not shown) arranged on an output axis of the electric motor 31, and a disc-like worm wheel 32 formed as a gear that can engage with the worm gear. Further, by forward rotation of the electric motor 31, the worm gear rotates the worm wheel 32 in a lock-release direction, and by reverse rotation of the electric motor 31, the worm gear rotates the worm wheel 32 in a looking direction. The drive device 30 is accommodated in a motor case 33 in a state that the worm gear is engaged with the worm wheel 32 as a unit, and is arranged in the housing chamber 13 along with the motor case 33.

The worm wheel 32 is provided with a cam 40 on its one disc face. The cam 40 is composed of a spiral-shaped cam groove 42 and an outer peripheral face 43, and an inner side wall 42a of the cam groove 42 and the outer peripheral face 43 are set as a cam face 41.

Figure 10:
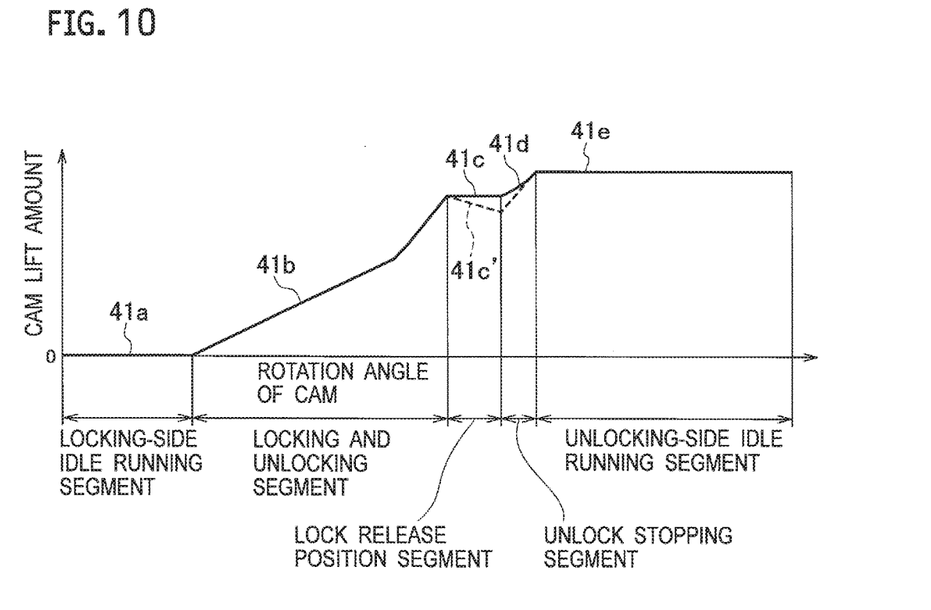
FIG. 10 is a cam displacement diagram showing a relationship between a cam rotation angle and a cam lift amount.
Figure 11:
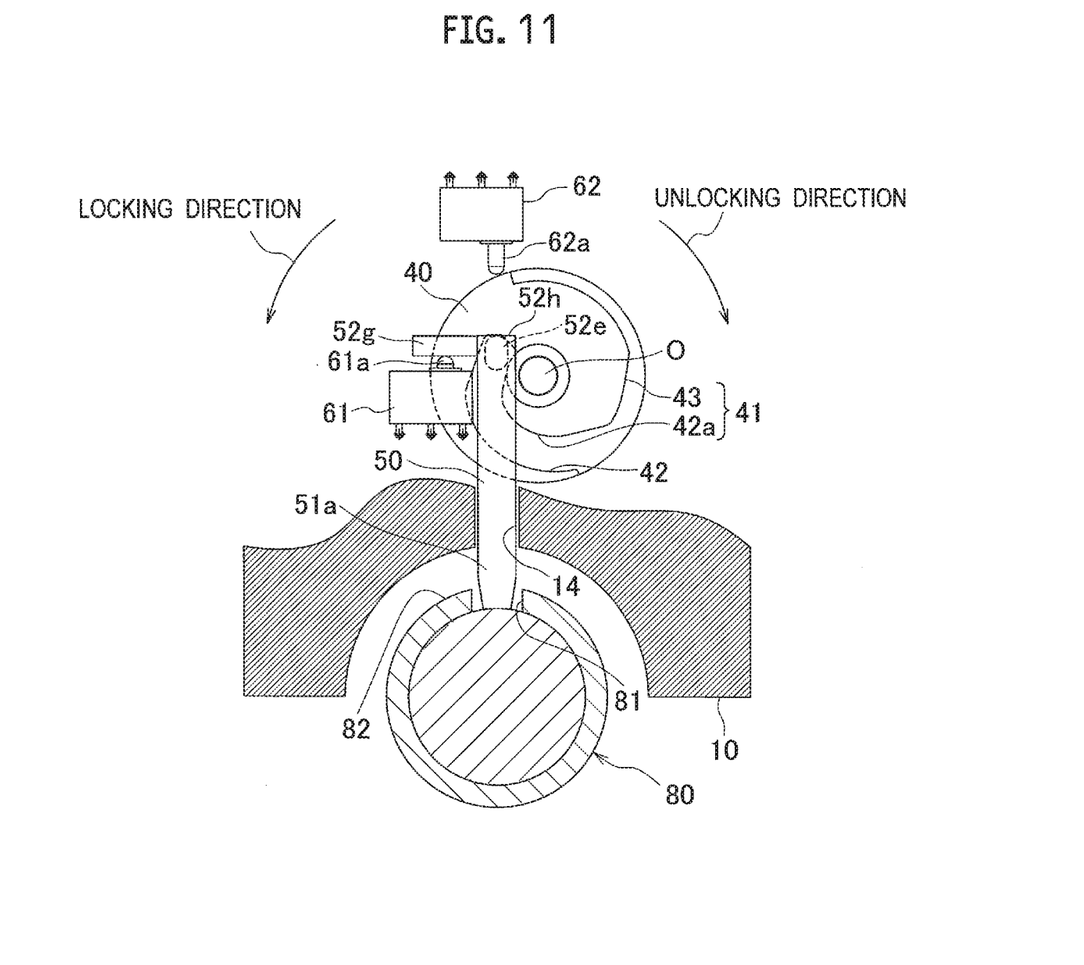
FIG. 11 is an outline cross sectional view showing a principal part of the embodiment in a state that a following protrusion is positioned in a locking-side idle running segment.
Figure 12:
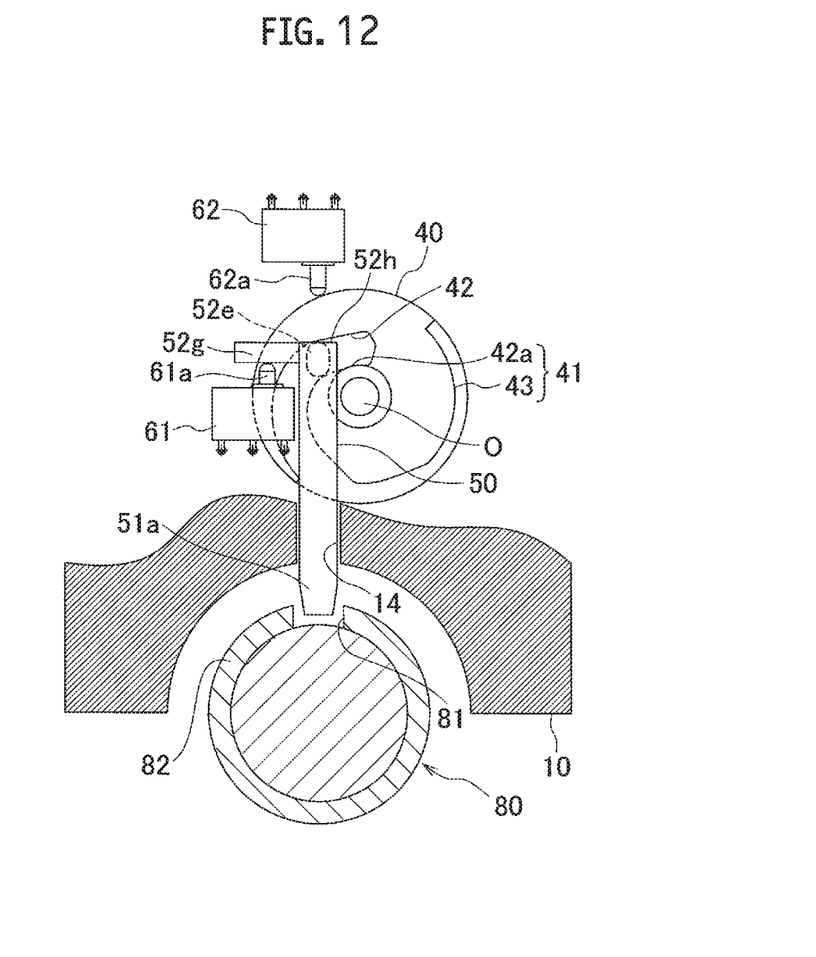
FIG. 12 is an outline cross sectional view showing a principal part of the embodiment in a state that the following protrusion is positioned in a locking and unlocking segment.
Figure 13:
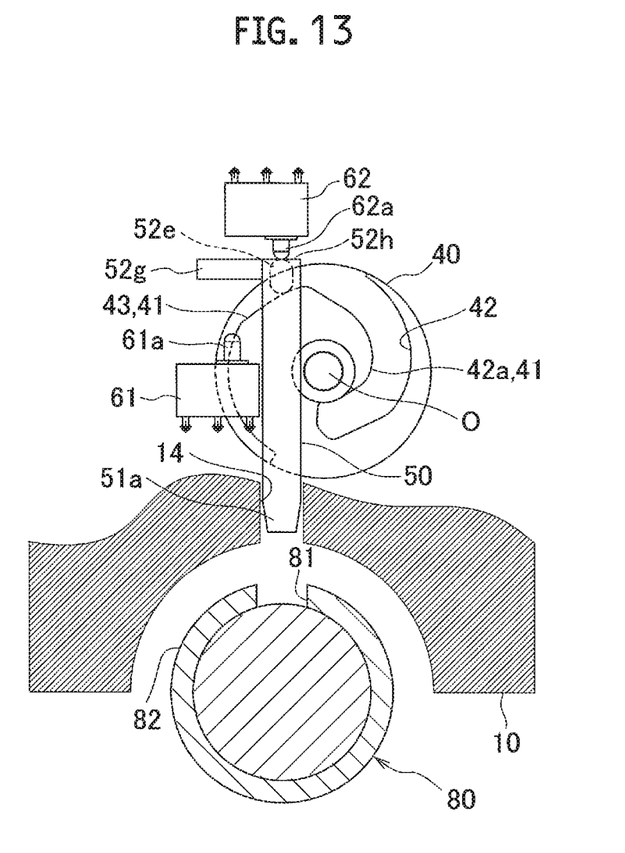
FIG. 13 is an outline cross sectional view showing a principal part of the embodiment in a state that the following protrusion is positioned in a lock release position segment.
Figure 14:
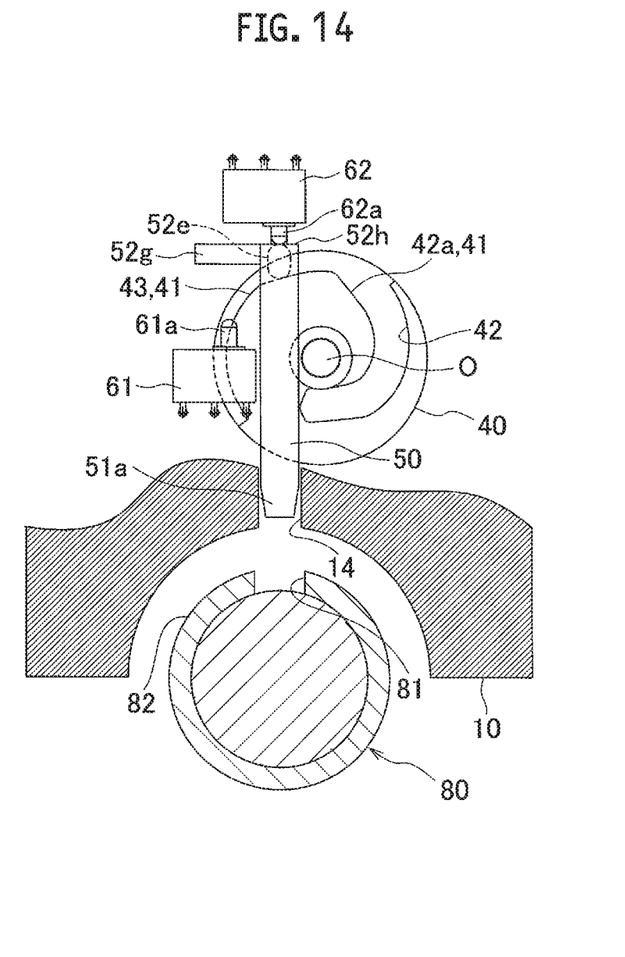
FIG. 14 is an outline cross sectional view showing a principal part of the embodiment in a state that the following protrusion is positioned in a lock release stopping segment.
Figure 15:
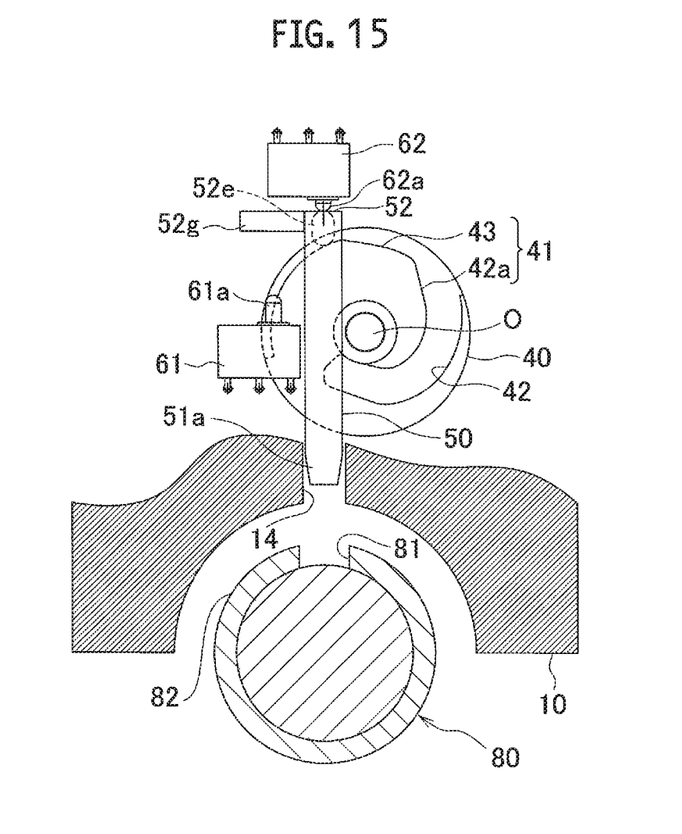
FIG. 15 is an outline cross sectional view showing a principal part of the embodiment in a state that the following protrusion is positioned in a lock release-side idle running segment.

The cam face 41, as shown by the solid line of FIG. 10, is composed of a locking-side idle running segment 41a, a locking and unlocking segment 41b, a lock release position segment 41c, an unlock stopping segment 41d, and an unlocking-side idle running segment 41e, and each segment is continuous in this order. Further, a cam lift amount is a dimension from the rotation center O to the cam face 41, and in this embodiment, it is set to be the smallest at the locking-side idle running segment 41a and the largest at the unlocking-side idle running segment 41e. Moreover, a change ratio of the cam lift amount to the rotation angle of the cam 40 in each segment of the cam face 41 is determined to be large or small by making the cam lift amount of the locking-side idle running segment 41a as a reference.

The locking-side idle running segment 41a corresponds to a locked position of the linked lock member 50, which is positioned at a center location of the spiral shape in the cam groove 42, and the cam lift amount is set to be constant (the movement amount of the lock member 50 is zero). In other words, the change ratio of the cam lift amount to the rotation angle of the cam 40 in the locking-side idle running segment 41a is set to be zero.

The locking and unlocking segment 41b corresponds to a path that the linked lock member 50 moves between the locked position and the unlocked position. In other words, it is set such that one side of the locking and unlocking segment 41b is continuous from the locking-side idle running segment 41a, and the other side is continuous from the lock release position segment 41c respectively, and the cam lift amount becomes larger as it goes from the locking-side idle running segment 41a toward the lock release position segment 41c. Further, the change ratio of the cam lift amount to the rotation angle of the cam 40 in the locking and unlocking segment 41b is set to be different on the locked position side and on the unlocked position side of the locking and unlocking segment 41b. The change ratio on the locked position side in the locking and unlocking segment 41b is set such that the change ratio becomes relatively small so that a pull-out torque becomes large since an engagement part 51a at the tip of the lock member 50 moves backward from an engaged state with an engagement groove 81 at the time of unlocking operation. The change ratio on the unlocked position side in the locking and unlocking segment 41b is set to be larger than the locked position side so that it moves backward quickly at the time of unlocking operation since the engagement part 51a of a lock body 51 is separated from the engagement groove 81.

The lock release position segment 41c corresponds to the unlocked position of the linked lock member 50, and the cam lift amount is set to be constant (the movement amount of the lock member 50 is zero and the change ratio of the cam lift amount is zero). Moreover, the change ratio of the cam lift amount to the rotation angle of the cam 40 in the lock release position segment 41c does not have to be zero, but it is sufficient if it is set to be at least smaller than the change ratio in the locking and unlocking segment 41b.

The unlock stopping segment 41d is a segment for the linked lock member 50 (hanger 52) to turn a later-described unlocking detection switch 62, and it is continuous from the lock release position segment 41c. The change ratio of the cam lift amount within the unlock stopping segment 41d is set to be a dimension that does not damage the unlocking detection switch 62 while considering operation strokes, scattering of the operation strokes, scattering of the assembly positions or the like that are necessary and sufficient for turning on the later-described unlocking detection switch 62. Further, the change ratio of the unlock stopping segment 41d is set such that a torque that is sufficient to operate the unlocking detection switch 62 is generated.

The unlocking-side idle running segment 41e is formed on the outer peripheral face 43 of the cam 40 to be continuous from the lock release position segment 41c, and the cam lift amount is set to be constant.

The lock member 50, as shown in FIGS. 5, 6, 8, and 9, is composed of the lock body 51 whose front end which becomes an advancing-side end engages with the engagement groove 81 provided on an outer peripheral face of the steering shaft 80, the hanger 52 which is engageably/disengageably linked with a rear end side which becomes a retreating-side end of the lock body 51, and a lock biasing member 53 which biases the lock body 51 from the retreating end side toward the advancing end side. Further, the lock body 51 and the hanger 52 which constitute the lock member 50 are slidably arranged in the guide hole 14 of the guide part 12 in a linked state. In other words, a linkage portion 50a of the lock body 51 and the hanger 52 is composed of a body-side linkage part 51b provided at the rear end of the lock body 51 and a hanger-side linkage part 52b provided at the front end of the hanger 52. Thus, the lock member 50 becomes freely displaced between the locked position which becomes the advancing end and the unlocked position which becomes the retreating end by the drive device 30. Moreover, in the locked position, the front end of the lock body 51 protrudes from the guide part 12 to engage with the engagement groove 81 to restrict rotation of the steering shaft 80. Furthermore, in the unlocked position, the front end of the lock body 51 retreats inside of the guide part 12 to be separated from the engagement groove 81 so that rotation of the steering shaft 80 becomes possible.

The lock body 51 is made of a plate-like hard member, and its front end is set as an engagement part 51a that engages with the engagement groove 81, and its rear end is set as the body-side linkage part 51b that is linked with the hanger 52. The body-side linkage part 51b is formed into an L-shape with a body-side neck part 51c that extends in the sliding direction and a body-side linkage protrusion 51d that protrudes from the rear end of the body-side neck part 51c to be orthogonal to the sliding direction.

The hanger 52 is composed of a member that has lower load resistance than the lock body 51. The hanger 52 is provided with the hanger-side linkage part 52b, a following protrusion 52e, the stopper 52f, and a switch arm part 52g.

The hanger-side linkage part 52b is arranged on the front end of the hanger 52, and formed into an L-shaped protrusion with a hanger-side neck part 52c and a hanger-side linkage protrusion 52d.

The hanger-side neck part 52c is thinner than other general part of the hanger 52 and extends in the sliding direction of the lock member 50.

The hanger-side linkage protrusion 52d protrudes from the front end of the hanger-side neck part 52c to be orthogonal to the sliding direction.

The following protrusion 52e is positioned at the rear end of the hanger 52 to protrude toward the worm wheel 32. The following protrusion 52e is arranged inside of the cam groove 42 in a state that the lock member 50 is assembled in the guide hole 14 and the worm wheel 32 is installed in the housing chamber 13. Further, when the worm wheel 32 makes forward rotation or reverse rotation, the following protrusion 52e follows while abutting the cam face 41 by receiving the biasing force of the lock biasing member 53.

The stopper 52f is provided on the rear end side of the hanger 52 to protrude on the back side of the face that following protrusion 52e is arranged. The stopper 52f slides with the hanger 52. Moreover, the stopper 52f is formed such that it engages with a stopper receiving part 18 at the locked position with respect to the locking direction.

The switch arm part 52g, as shown in FIG. 11-FIG. 15, is composed of a square column shaped cantilever beam that extends along a rotary surface of the worm wheel 32 while being orthogonal to the sliding direction of the hanger 52 at the rear end part of the hanger 52. The switch arm part 52g abuts an operation part 61a of a later-described locking detection switch 61 and turns on the later-described locking detection switch 61 when the lock member 50 has moved from the unlocked position to the locked position.

The lock biasing member 53 is made of a coil spring and is arranged in a compressed state between a retreating end wall 14a of the guide hole 14 and a retreating end 51e on the rear face side of the body-side linkage part 51b. Further, the hanger 52 and the lock body 51 are biased in a direction of mutually separating each other by the compression reaction force of the lock biasing member 53 while their linked state is retained. Moreover, by such a linkage structure, the lock member 50 is extendable.

The control board 60 externally supplies electric power to the electric motor 31 and performs the control of forward rotation, reverse rotation and stopping. Also, the locking detection switch 61 and the unlocking detection switch 62 are arranged on the control board 60. The locking detection switch 61 and the unlocking detection switch 62 are composed of momentary switches that are turned on only while their operation portions are pressed.

The locking detection switch 61 is a switch which detects that the lock member 50 has moved from the unlocked position to the locked position. Also, the locking detection switch 61 is arranged on the control board 60 in the vicinity of the stopper receiving part 15 along the sliding direction of the lock member 50 (hanger 52).

The unlocking detection switch (position detection device) 62 is a switch which detects that the lock member 50 (hanger 52) has moved from the locked position to the unlocked position. Also, the unlocking detection switch 62 is arranged on the control board 60 on the extension line of the retreating end side along the sliding direction of the lock member 50 (hanger 52).

Figure 4:
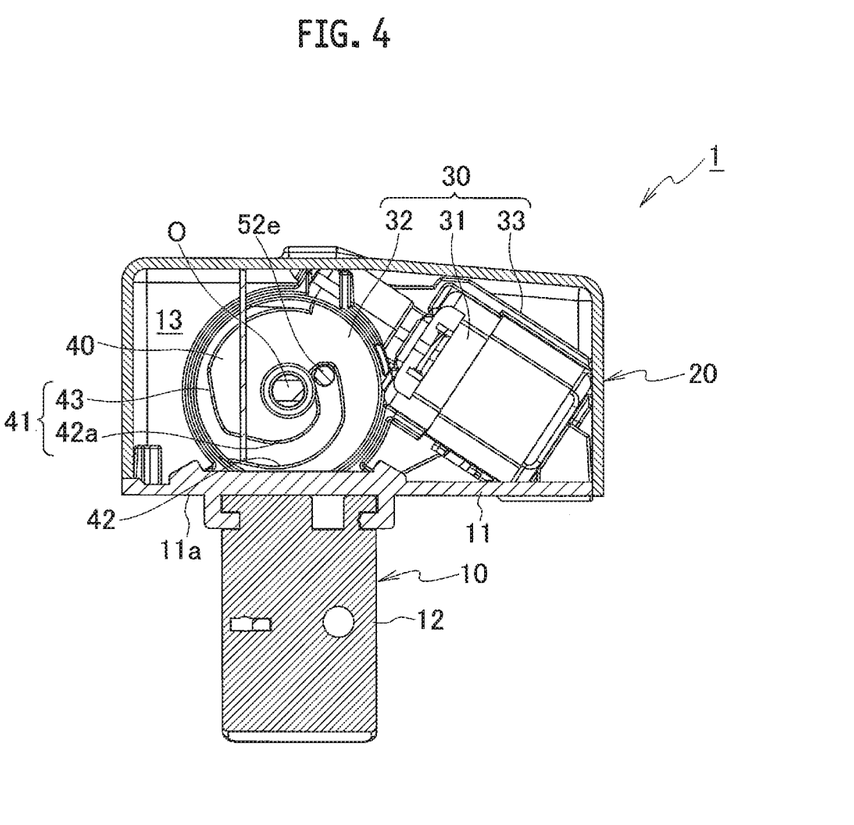
FIG. 4 is a cross sectional view taken along line 4-4 of FIG. 2 in a locked state.
Figure 5:
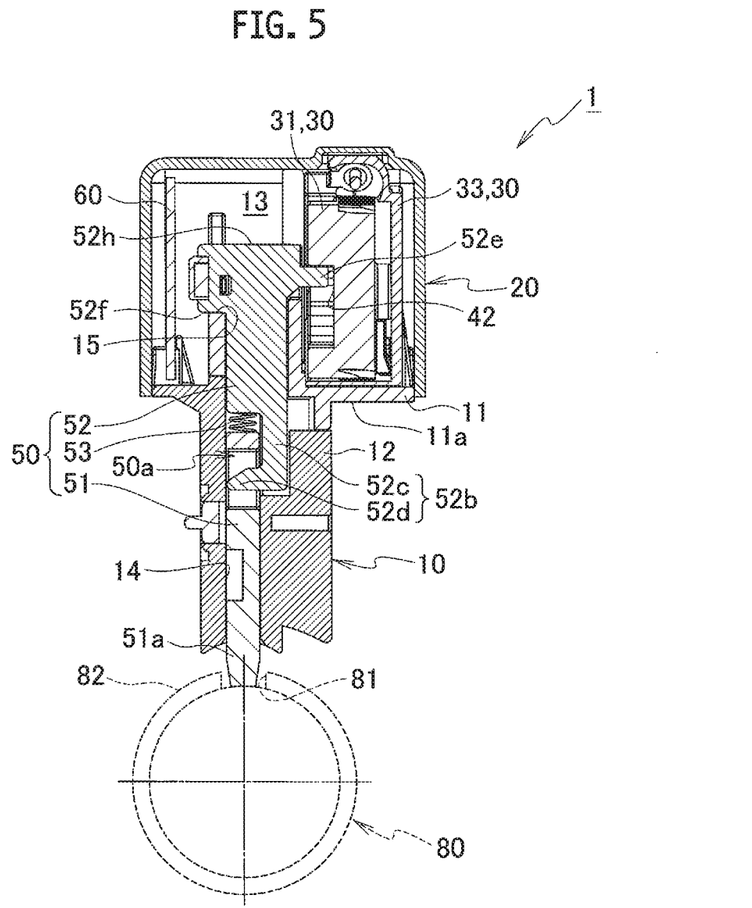
FIG. 5 is a cross sectional view taken along line 5-5 of FIG. 3 in a locked state.
Figure 6:
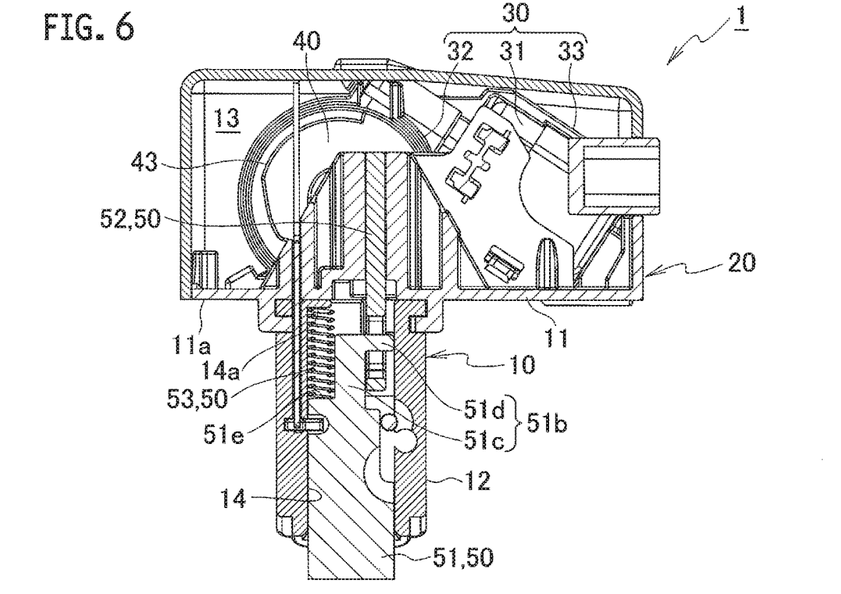
FIG. 6 is a cross sectional view taken along line 6-6 of FIG. 2 in a locked state.

Next, with the above structure, operations of the electric steering lock device 1 will be explained. First, as shown in FIG. 4-FIG. 6, in the electric steering lock device 1 with the lock member 50 being held in the locked position, the lock body 51 protrudes from the guide part 12. Thus, the engagement part 51a of the lock body 51 engages with the engagement groove 81 of the steering shaft 80 and restricts rotation of the steering shaft 80.

Then, when an unlocking signal is inputted from the vehicle body side to the electric steering lock device 1 in the locked state, the control board 60 supplies electric power to forward-rotate the electric motor 31. When the electric motor 31 is forward-rotated, the worm wheel 32 rotates in the unlocking direction (clockwise in FIG. 11) through the worm gear. When the worm wheel 32 rotates in the unlocking direction, as shown in FIG. 11-FIG. 15, the following protrusion 52e follows on the cam face 41 in the order of the locking and unlocking segment 41b, the lock release position segment 41c, and the unlock stopping segment 41d while resisting the biasing force of the lock biasing member 53. Thus, the lock member 50 moves from the locked position to the unlocked position.

Further, when the following protrusion 52e approaches the unlock stopping segment 41d, a retreating end 52h of the hanger 52 abuts an operation part 62a of the unlocking detection switch 62, and the unlocking detection switch 62 is turned on. Then, the ON signal of the unlocking detection switch 62 is inputted to the control board 60, and the electric power from the control board 60 to the electric motor 31 is stopped, and the electric motor 31 is stopped. Thus, the lock member 50 is held in the unlocked position.

Further, at the time of unlocking operation, it is conceivable that the unlocking detection switch 62 is not turned on in the locking and unlocking segment 41b for some reason and the following protrusion 52e follows on the unlocking-side idle running segment 41e. In such a case, since the operation time of the electric motor 31 becomes longer than a set time, the control board 60 determines abnormality and the control board 60 forcibly stops the electric motor 31 within the unlocking-side idle running segment 41e.

Moreover, it is conceivable that there is a case in which the lock body 51 is bitten in the engagement groove 81 and cannot be moved to the unlocked position. In such a case also, since the operation time of the electric motor 31 becomes longer than a set time, the control board 60 determines abnormality and the control board 60 forcibly stops the electric motor 31.

Figure 7:
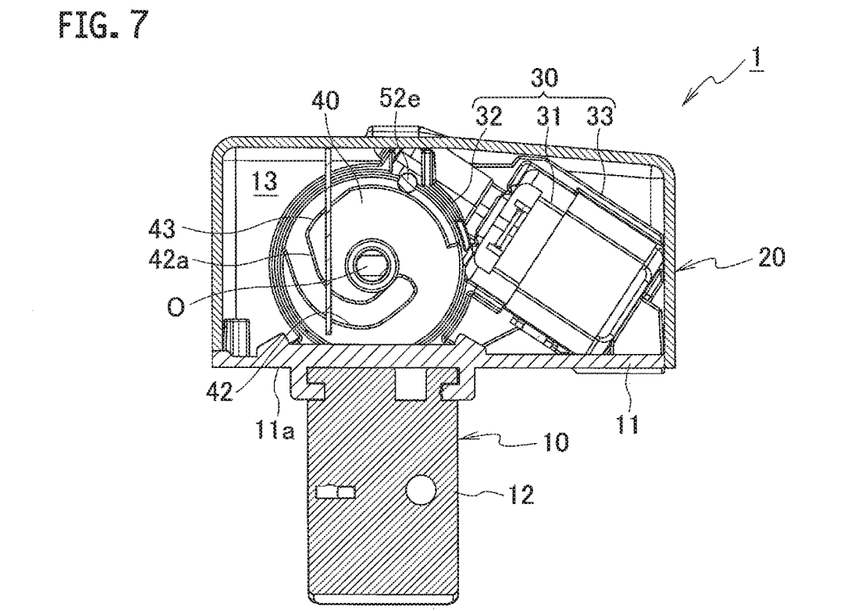
FIG. 7 is a cross sectional view taken along line 4-4 of FIG. 2 in an unlocked state.
Figure 8:
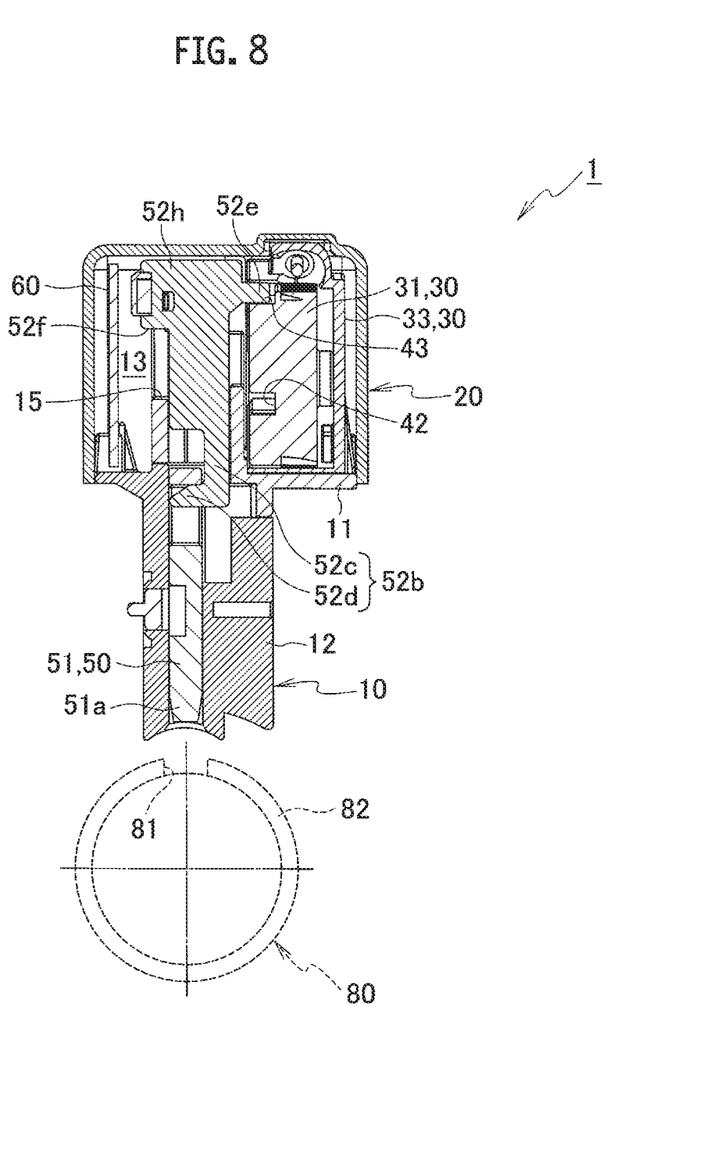
FIG. 8 is a cross sectional view taken along line 5-5 of FIG. 3 in an unlocked state.
Figure 9:
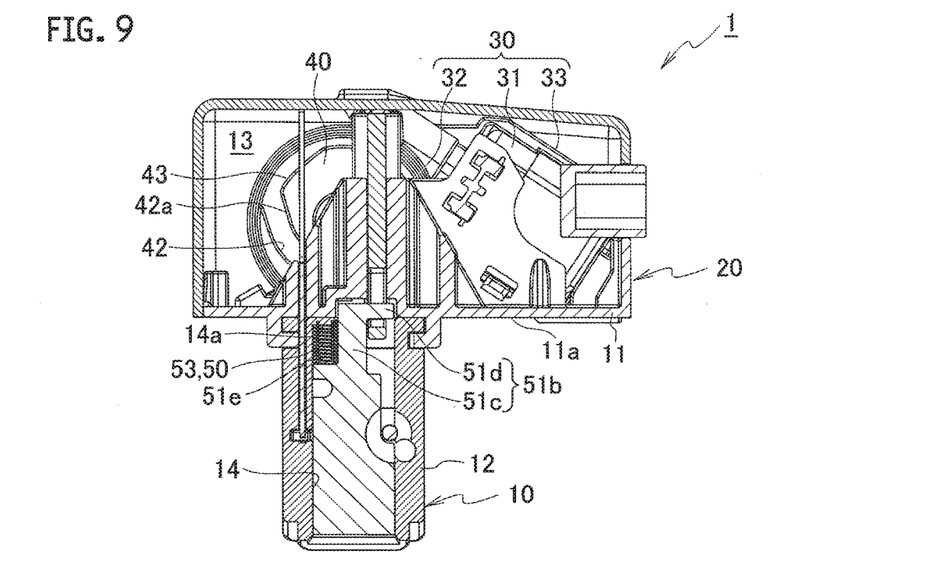
FIG. 9 is a cross sectional view taken along line 6-6 of FIG. 2 in an unlocked state.

In the electric steering lock device 1 in the unlocked state, as shown in FIG. 7-FIG. 9, the lock body 51 is positioned in the unlocked position that is drawn inside of the guide hole 14. Thus, the engagement between the engagement part 51a of the lock body 51 and the engagement groove 81 of the steering shaft 80 is released, and rotation of the steering shaft 80 becomes possible. Further, the following protrusion 52e is positioned in the unlock stopping segment 41d of the cam face 41. That is, the lock member 50 is held at a position that is further retreated from the unlocked position.

Incidentally, the unlock stopping segment 41d is set such that its cam lift amount becomes smaller as it goes toward the lock release position segment 41c. Thus, in a case that the engagement between the worm wheel 32 and the worm gear comes off for some reason, it is conceivable that the worm wheel 32 may rotate toward the locking direction by the biasing force of the lock biasing member 53 and the following protrusion 52e may move to the lock release position segment 41c.

However, even if the following protrusion 52e moves to the lock release position segment 41c from the unlock stopping segment 41d, since the change ratio of the cam lift amount in the lock release position segment 41c is zero, it does not move to the locking and unlocking segment 41b. In other words, it has a structure in which even if the engagement between the worm wheel 32 and the worm gear comes off for some reason, the lock member 50 does not advance to the locked position side by the biasing force of the lock biasing member 53 than the unlocked position.

Next, when a locking signal is inputted to the electric steering lock device 1 in the unlocked state from the vehicle body side via the control board 60, the control board 60 supplies electric power to reverse-rotate the electric motor 31. Then, when the electric motor 31 is reverse-rotated, the worm wheel 32 rotates in the locking direction (counterclockwise in FIG. 11) through the worm gear. When the worm wheel 32 rotates in the locking direction, the following protrusion 52e follows on the cam face 41 in the order of the unlock stopping segment 41d, the lock release position segment 41c, and the locking and unlocking segment 41b by the biasing force of the lock biasing member 53, and the lock member 50 moves from the unlocked position to the locked position.

When the lock member 50 reaches the locked position while following on the locking and unlocking segment 41b, the switch arm part 52g abuts the operation part 61a of the locking detection switch 61, and the locking detection switch 61 is turned on. Then, the ON signal of the locking detection switch 61 is inputted to the control board 60, and the electric power from the control board 60 to the electric motor 31 is stopped and the electric motor 31 is stopped. Thus, the lock member 50 is held in the locked position. As shown in FIG. 4-FIG. 6, in the electric steering lock device 1 in which the lock member 50 is held in the locked position, the engagement part 51a of the lock body 51 engages with the engagement groove 81 of the steering shaft 80 and restricts rotation of the steering shaft 80.

In a case that the engagement part 51a of the lock body 51 runs onto a protrusion portion 82 that constitutes the engagement groove 81 of the steering shaft 80 when it moves to the locked position, the lock biasing member 53 is compressed to shrink and the hanger 52 moves to the locked position in a state that the lock body 51 remains to run on the protrusion portion 82. Then, when the steering shaft 80 rotates and the protrusion portion 82 slips off from the engagement part 51a of the lock body 51, the engagement part 51a engages with the engagement groove 81 by the biasing force of the lock biasing member 53 to restrict rotation of the steering shaft 80.

Further, there is a possibility that the lock body 51 engages with the engagement groove 81 before the locking detection switch 61 is turned on because of scattering of the operation strokes of the locking detection switch 61 and scattering of the assembly positions. In such a case also, since the lock member 51 is pressed against the bottom part of the engagement groove 81 and the lock biasing member 53 is compressed to shrink, while the hanger 52 advances, disadvantage does not occur.

Moreover, it is conceivable that the locking detection switch 61 is not turned on in the locking and unlocking segment 41b for some reason, and the following protrusion 52e follows on the locking-side idle running segment 41a. In such a case, since the operation time of the electric motor 31 becomes longer than a set time, the control board 60 determines abnormality and the control board 60 forcibly stops the electric motor 31 within the locking-side idle running segment 41a. Furthermore, the stopper 52f abuts the stopper receiving part 15, and restricts the lock member 50 from advancing further from the locked position.

With the above structure, in this embodiment, by setting the cam face 41 such that the cam lift amount in the lock release position segment 41c is made constant and the change ratio of the cam lift amount to the rotation angle of the cam 40 in the lock release position segment 41c is smaller than the change ratio in the locking and unlocking segment 41b, the cam 40 does not rotate toward the locking direction in a state that the lock member 50 is positioned in the unlocked position. Thus, it is possible to restrict rotation of the cam 40 without providing separate parts.

Moreover, by constructing the cam face 41 such that the cam lift amount in the lock release position segment 41c is made constant, the locking and unlocking segment 41b and the lock release position segment 41c can be made smoothly continuous. Thus, it is possible to reduce an occurrence of tapping sound when the lock member 50 that follows the cam face 41 is displaced between the locking and unlocking segment 41b and the lock release position segment 41c.

By having a structure in which the unlocking detection switch (position detection device) 62 detects that the lock member 50 is positioned in the unlocked position, it is possible to accurately grasp the position of the lock member 50. Thus, even in a case that the linkage between the cam 40 and the lock member 50 has come off, it is possible to prevent that a locked state is erroneously determined as an unlocked state.

By having a structure in which the change ratio in the unlock stopping segment 41d is larger than the change ratio in the lock release position segment 41c, and it is arranged in the order of the locking and unlocking segment 41b, the lock release position segment 41c, and the unlock stopping segment 41d, it is possible that rotation of the cam 40 toward the unlocking direction can be stopped at a position that the lock member 50 is more retreated than the unlocked position. Thus, in the unlocked state, the lock member 50 can be held at a position that is more retreated than the unlocked position inside of the frame 10.

Further, in this embodiment, as shown by the solid line of FIG. 10, the cam face 41 is structured such that the cam lift amount in the lock release position segment 41c is constant; however, as shown by the broken line of FIG. 10, the cam face 41 may also be structured such that the cam lift amount in the lock release position segment 41c' becomes smaller as the rotation angle of the cam increases. In a case that it is structured as such, when rotation of the worm wheel 32 toward the locking direction becomes freely possible for some reason, and the worm wheel 32 rotates to move the following protrusion 52e from the unlock stopping segment 41d to the lock release position segment 41c by the biasing force of the lock biasing member 53, in order for the following protrusion 52e to move further from the lock release position segment 41c to the locking and unlocking segment 41b, the cam 40 has to rotate toward the locking direction while resisting the biasing force of the lock biasing member 53. Since such rotation is not possible without motive power, it is possible to prevent the lock member 50 from unexpectedly moving to the locked position further as compared with this embodiment, and it is possible to further improve security as compared with this embodiment.

In addition, in such a structure, when the following protrusion 52e moves from the locking and unlocking scent 41b to the lock release position segment 41c, there is a case in which tapping sound occurs by the following protrusion 52e not being able to follow on the cam face 41 and bouncing at the border portion of the both segments. Thus, it may also be made to have a structure to inform an operator that the electric steering lock device 1 has been unlocked by the unlocking operation by generating the tapping sound such that the operator can hear it.

Furthermore, in this embodiment, the momentary switch is used as the unlocking detection switch (position detection device), but it is not limited to this, and a structure that uses various sensors is possible in order to achieve similar operations and advantageous effects.

What is claimed is:

1. An electric steering lock device, comprising:
   a cam arranged to allow forward rotation and reverse rotation inside of a frame;
   a lock member which, while following a cam face of the rotating cam, is arranged to be movable forward and backward between a locked position at an advancing end and an unlocked position at a retreating end, and
   a position detection device that detects that the lock member is positioned at the unlocked position is arranged between the frame and the lock member,
   wherein the cam face comprises:
     a locking and unlocking segment for moving the lock member between the locked position and the unlocked position;
     a lock release position segment in which the lock member is held in the unlocked position; and
     an unlock stopping segment that is constructed to have the change ratio of a cam lift amount that is larger than the change ratio of the cam lift amount in the lock release position segment,
   wherein the locking and unlocking segment, the lock release position segment, and the unlock stopping segment are arranged in the order of the locking and unlocking segment, the lock release position segment, and the unlock stopping segment,
   wherein a change ratio of the cam lift amount to a rotation angle of the cam in the lock release position segment is constructed to be zero,
   wherein the unlock stopping segment is a segment to operate the position detection device, the change ratio of the cam lift amount to the rotation angle of the cam in the unlock stopping segment is set to operate a cam follower operatively connected to the lock member so that the lock member, according to the rotation angle of the cam, operates the position detection device.

2. An electric steering lock device, comprising:
   a cam arranged to allow forward rotation and reverse rotation inside of a frame;

a lock member which, while following a cam face of the rotating cam, is arranged to be movable forward and backward between a locked position at an advancing end and an unlocked position at a retreating end; and     a position detection device that detects that the lock member is positioned at the unlocked position is arranged between the frame and the lock member,     wherein the cam face comprises:

a locking and unlocking segment for moving the lock member between the locked position and the unlocked position;

a lock release position segment in which the lock member is held in the unlocked position, and         an unlock stopping segment that is constructed to have the change ratio of a cam lift amount that is larger than the change ratio of the cam lift amount in the lock release position segment,     wherein the locking and unlocking segment, the lock release position segment, and the unlock stopping segment are arranged in the order of the locking and unlocking segment, the lock release position segment, and the unlock stopping segment,     wherein the cam face has a change ratio of a cam lift amount to a rotation angle of the cam in each segment of the cam face, as determined by a cam lift amount such that the cam lift amount in the lock release position segment becomes smaller as a rotation angle of the cam increases, so that a cam follower operatively connected to the lock member positions the lock member according to the rotation angle of the cam,     and wherein the unlock stopping segment is a segment to operate the position detection device, the change ratio of the cam lift amount to the rotation angle of the cam in the unlock stopping segment is set to operate a cam follower operatively connected to the lock member so that the lock member according to the rotation angle of the cam operates the position detection device.

3. The electric steering lock device according to claim 2, wherein the cam face has a dimension that a change ratio of the cam lift amount is constant in the lock release position segment.

4. The electric steering lock device according to claim 1, wherein the cam lift amount in the unlock stopping segment has an operation stroke sufficient for operating the position detection device.

5. The electric steering lock device according to claim 1, wherein the change ratio of the cam lift amount in the unlock stopping segment is set to generate a torque that is sufficient to operate the position detection device.

\* \* \* \* \*